US012486957B1

(12) United States Patent
Liang

(10) Patent No.: US 12,486,957 B1
(45) Date of Patent: Dec. 2, 2025

(54) TAPE CAMPING LAMP

(71) Applicant: Lu Liang, Shangqiu (CN)

(72) Inventor: Lu Liang, Shangqiu (CN)

( * ) Notice: Subject to any disclaimer, the term of this patent is extended or adjusted under 35 U.S.C. 154(b) by 0 days.

(21) Appl. No.: 18/959,473

(22) Filed: Nov. 25, 2024

(30) Foreign Application Priority Data

Nov. 6, 2024 (CN) ........................ 202422706145.5

(51) Int. Cl.

| | |
|---|---|
| ***F21S 4/24*** | (2016.01) |
| ***F21S 9/02*** | (2006.01) |
| ***F21V 21/40*** | (2006.01) |
| ***F21V 23/04*** | (2006.01) |
| ***F21V 23/06*** | (2006.01) |
| ***F21V 27/02*** | (2006.01) |
| ***F21Y 115/10*** | (2016.01) |

(52) U.S. Cl.

CPC . *F21S 4/24* (2016.01); *F21S 9/02* (2013.01); *F21V 21/40* (2013.01); *F21V 23/04* (2013.01); *F21V 23/06* (2013.01); *F21V 27/02* (2013.01); *F21Y 2115/10* (2016.08)

(58) Field of Classification Search

CPC ..... F21S 4/24; F21S 9/02; F21Y 21/40; F21Y 23/04; F21Y 23/06; F21Y 27/02

USPC ..................................................... 362/249.14

See application file for complete search history.

(56) References Cited

U.S. PATENT DOCUMENTS 11,560,989 B1 * 1/2023 Herman .................... F21S 4/24
11,662,069 B1 * 5/2023 Huang ...................... F21V 1/06 362/183
11,732,849 B1 * 8/2023 Tagle ..................... G08B 5/006 362/249.01

* cited by examiner

*Primary Examiner* — Laura K Tso

(74) *Attorney, Agent, or Firm* — Nitin Kaushik

(57) ABSTRACT

The present disclosure discloses a lighting lamp, and aims to provide a tape camping lamp which is small in occupied space and convenient to carry, can prevent power shortage of batteries, and is convenient to use and good in lighting effect. The key point of the technical scheme lies in that a lamp string is arranged on an entwined module inside a lamp housing. The entwined module rotates on a base through a rolling bearing. The base includes a relatively fixed annular mounting structure and a rotating part which is arranged inside the annular mounting structure and can rotate relative to the annular mounting structure. The annular mounting structure is connected with the lamp housing. The pull-out and withdrawal of the lamp string are realized while the lamp housing and the annular mounting structure keep still.

8 Claims, 4 Drawing Sheets

TAPE CAMPING LAMP

TECHNICAL FIELD

The present disclosure relates to a lighting lamp, and more specifically, relates to a tape camping lamp.

BACKGROUND

As an outdoor activity, camping meets the psychological needs of campers by staying overnight in the wild for a short time. In the process of camping in the wild, the camping lamp, as a tool to provide lighting and prevent wild animals from approaching, is essential in the camping process. The camping lamp usually has the advantages of being small in weight, convenient to carry and long in use time.

At present, the camping lamps on the market are large in size and very inconvenient to carry, and the battery power is usually replenished by charging. When the power is insufficient in the wild, the camping lamp cannot be charged and cannot meet the lighting needs.

SUMMARY

Aiming at the disadvantages in the prior art, the present disclosure aims to provide a tape camping lamp which is small in occupied space and convenient to carry, can prevent power shortage of batteries, and is convenient to use and good in lighting effect.

In order to realize the purpose, the present disclosure provides the following technical scheme. A tape camping lamp includes a base and a lamp housing arranged on the base. The lamp housing is internally provided with an entwined module. The entwined module is internally provided with a rolling bearing. The rolling bearing is configured to allow the entwined module to rotate on the base. The entwined module is H-shaped. A mounting cavity for accommodating the lamp string is arranged in a gap between the entwined module and the lamp housing. The entwined module rotates through the rolling bearing to realize the pull-out and withdrawal of the lamp string inside the lamp housing. The base includes a mounting part and a rotating part. The mounting part is provided with an annular mounting structure sleeving the periphery of the lamp housing and detachably connected with the lamp housing. The rotating part is arranged inside the mounting part and rotatably connected with the mounting part. The rotating part is also provided with a plurality of inserted rods. Inserted slots are formed in the entwined module at the positions corresponding to the inserted rods. The entwined module is fixed with the rotating part through the inserted rods and the inserted slots. The rotating part is also internally provided with a battery jar. The battery jar is configured to place dry batteries for power supply. A circuit board is arranged on one side of the battery jar. The circuit board is electrically connected with the battery jar. The circuit board is also provided with a control switch and a power indicator.

Through further arrangement of the present disclosure, a clamping slot is also formed in a side wall of the lamp housing, the clamping slot is internally provided with a clamping hook piece, a part of the clamping hook piece arranged inside the lamp housing is provided with an embedded slot, a part of the clamping hook piece arranged outside the lamp housing is provided with a hook claw:

Preferably, an upper end of the entwined module is also provided with a connector. One end of the lamp string passes through the connector to be electrically connected with the circuit board, and the other end of the lamp string is connected with the embedded slot of the clamping hook piece. The circuit board is also provided with a charging port. The charging port is also provided with a baffle plate.

Through further arrangement of the present disclosure, a groove is also formed in the rotating part. The groove is internally provided with a rotating handle. The rotating handle is configured to rotate inside the groove to be exposed out of/retracted back to the mounting part.

Through further arrangement of the present disclosure, the lamp housing, the base and the entwined module are distributed concentrically and coaxially.

Through further arrangement of the present disclosure, the width-diameter ratio of the rolling bearing inside the entwined module is set to be 0.3-0.5.

Through further arrangement of the present disclosure, a luminous plate is also arranged at the bottom of the entwined module. The luminous plate is provided with a plurality of LED (Light Emitting Diode) lamp beads. The luminous plate is electrically connected the circuit board. The lamp housing is made of a transparent material.

Through further arrangement of the present disclosure, a U-shaped slot is also formed in the annular mounting structure. The U-shaped slot is internally provided with a hook piece. The hook piece is configured to rotate around the annular mounting structure. The shape of the hook piece is matched with the U-shaped slot.

Through further arrangement of the present disclosure, the top of a rotating shaft is also provided with a plurality of fixture blocks. The fixture blocks are distributed along the rotating direction of the rotating shaft. A fixture slot is formed in each fixture block. The lamp string is clamped into the fixture slot. An arc-shaped wire structure is formed at the top of the rotating shaft. The arc length of the arc-shaped wire structure is ¾ of the circumference of the rotating shaft.

By adopting the technical scheme, a lamp string is arranged on an entwined module inside a lamp housing. The entwined module rotates on a base through a rolling bearing. The base includes a relatively fixed annular mounting structure and a rotating part which is arranged inside the annular mounting structure and can rotate relative to the annular mounting structure. The annular mounting structure is connected with the lamp housing. The rotating part rotates inside the annular mounting structure, so that the pull-out and withdrawal of the lamp string are realized while the lamp housing and the annular mounting structure keep still. The lamp string with a long length is stored in a mounting cavity inside the lamp housing in a twining manner. The overall storage is convenient, and the occupied space of the lamp string is reduced, so that the lamp string is prevented from being entwined. Dry batteries are used for power supply in the lighting manner of the lamp string. When the power of the lamp string is in shortage, the power is supplemented just by changing the dry batteries inside a battery jar. The operation is simple, and the practicability is high. Three dry batteries can be placed inside the battery jar, so that the lighting time of the lamp string is prolonged, and the overall cruising ability is improved.

Further, in order to facilitate the lamp string to be pulled out and withdrawn inside the lamp housing. The clamping slot is formed in the side wall of the lamp housing. The clamping slot is internally provided with a clamping hook piece. The clamping hook piece is used for being connected with the lamp string. The lamp string can be pulled out of the clamping slot through the clamping hook piece and is arranged on the outer side of the lamp housing. When the lamp string is pulled out of the clamping slot, the rotating part rotates in a first direction inside the annular mounting structure, and the clamping hook piece is also provided with a hook claw, so that a head end of the lamp string can hang at a high place through the hook claw, and the lighting range is wider. At the same time, when the lamp string needs to be pulled back into the lamp housing to be stored, the rotating part rotates in a second direction inside the annular mounting structure. Moreover, the other end of the lamp string passes through the connector on the entwined module to be electrically connected with the circuit board, and the rotating part rotates through the rotating handle. During the rotation of the rotating part, the entwined module is fixed with the rotating part, so that the entwined module synchronously rotates. At the same time, the lamp string is entwined on the entwined module to complete the storage of the lamp string.

At the same time, during the rotation of the entwined module, the rolling bearing is kept fixed at the bottom of the entwined module, and the installation is convenient, so that the radial run-out of the rolling bearing in the rotational process is effectively avoided. The pull-out and withdrawal of the lamp string are stable, and the width-diameter ratio of the rolling bearing is set to be 0.3-0.5. The small width-diameter ratio can provide higher operational stability, and the rolling bearing does not need to receive excessive bearing capacity in the rotational process. If the width-diameter ratio of the rolling bearing is greater than 0.5, the width of the bearing becomes larger, and the stability in the rotational process is reduced. At the same time, in order to adapt the bearing, a larger lamp housing needs to be provided for assembly, so that the overall volume is increased, and the overall convenience is reduced. Moreover, when the lamp string is pulled out, for the sake of fixed fixture of the lamp string, the fixture slot for clamping the lamp string is formed in the top of the rotating shaft. The arc-shaped wire structure is formed after the lamp string is clamped, and the length of the arc-shaped wire structure is ¾ of the circumference, so that the lamp string fixedly abuts against the fixture slot after being pulled. The lamp string abuts against corners of the fixture slot inside the arc-shaped wire structure to form a plurality of fixed points, so that the lamp string is fixed through each fixed point when being pulled, so that the fixation effect is improved.

Moreover, in the process of using the device, the luminous effect of the lamp string is controlled by the circuit board arranged inside the rotating part, and the circuit board is provided with a control switch. The switching and brightness of the lamp string can be simply adjusted through the control switch. At the same time, the hook piece can rotate around the annular mounting structure, and provides a handle for grabbing or hanging the camping lamp to facilitate the overall suspension and movement. A luminous plate is arranged at the bottom of the entwined module. The luminous plate is provided with a plurality of LED lamp beads. The lamp housing is arranged to be transparent. That is, the brightness of the luminous plate can be emitted out through a transparent part of the lamp housing, so that the lighting effect is good. At the same time, the circuit board is provided with a power indicator. The power indicator is configured to give out green light when the power of the batteries is sufficient and give out yellow light when the power of the batteries is low; so that a user can accurately obtain the current information of a power supply, the problem that the power of the power supply is in shortage is avoided, and the overall using effect is good.

Reference signs in attached figures: 1, lamp housing: 2, entwined module: 21, inserted slot: 3, rolling bearing: 4, mounting cavity: 5, annular mounting structure: 6, rotating part; 61, inserted rod: 62, battery jar: 63, dry battery: 64, circuit board: 65, control switch: 66, power indicator: 7, clamping slot: 8, clamping hook piece: 81, embedded slot: 82, hook claw: 9, connector: 10, charging port: 11, baffle plate: 12, rotating handle; 13, groove: 14, luminous plate: 15, LED lamp bead: 16, U-shaped slot: 17, hook piece: 18, fixture block; and 19, fixture slot: 20, rotating shaft.

DETAILED DESCRIPTION OF THE EMBODIMENTS

Figure 1:
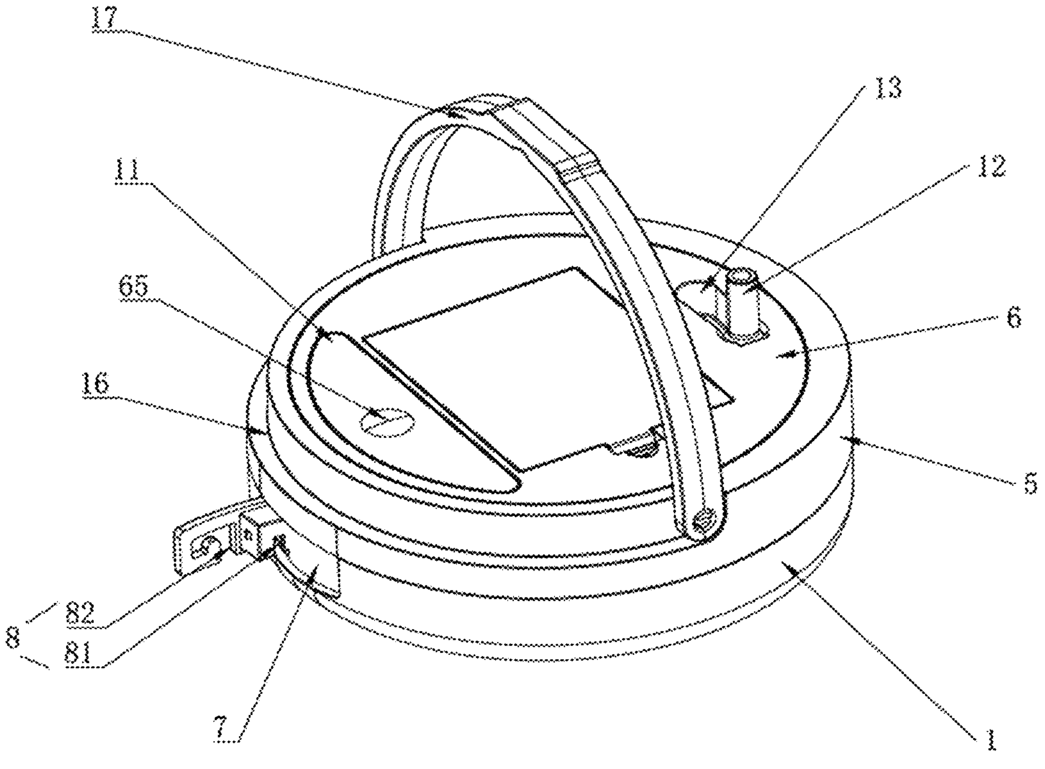
FIG. 1 is a specific structural schematic diagram of a tape camping lamp in an embodiment of the present disclosure.
Figure 2:
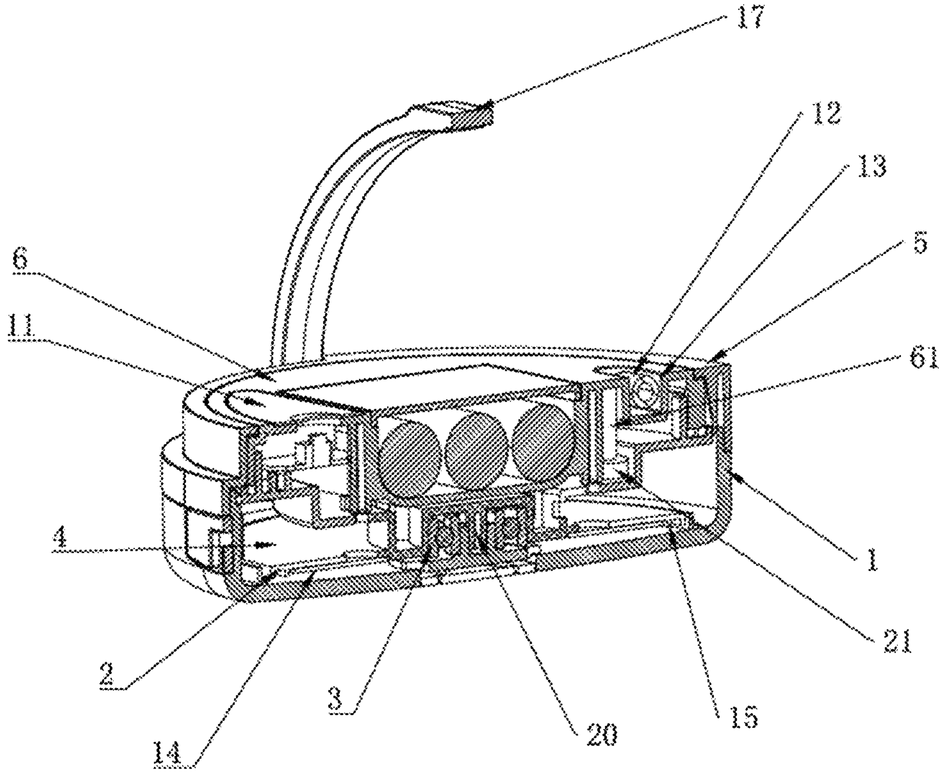
FIG. 2 is a section view of a tape camping lamp in an embodiment of the present disclosure.
Figure 3:
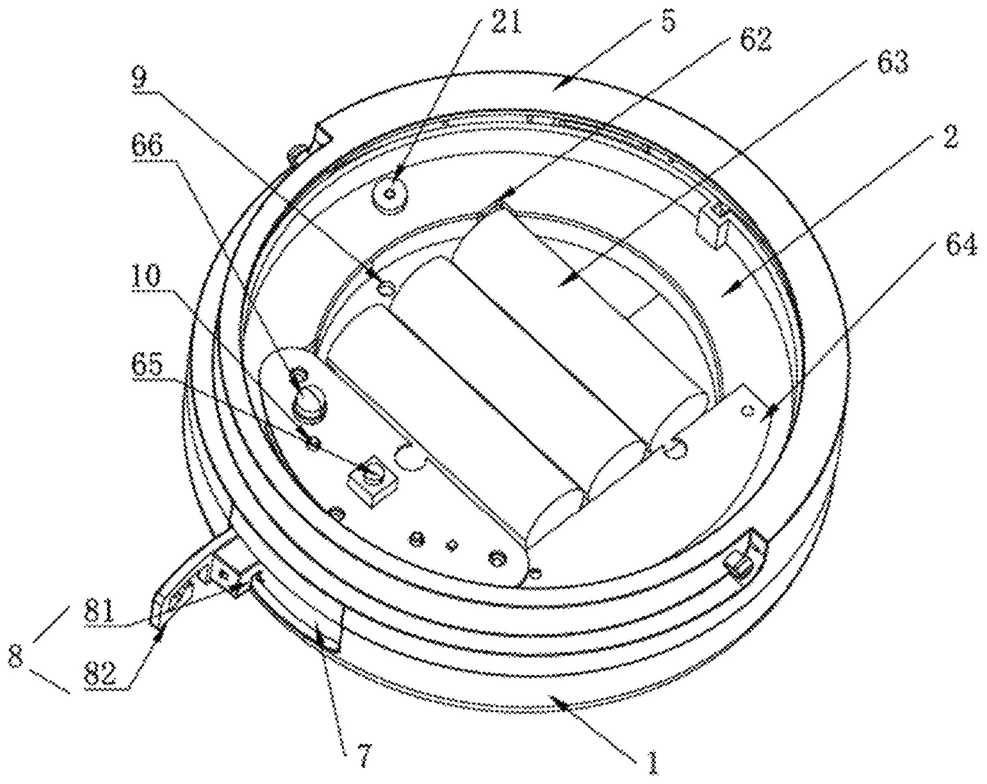
FIG. 3 is a structural schematic diagram of a tape camping lamp of which an upper end face is disassembled in an embodiment of the present disclosure.
Figure 4:
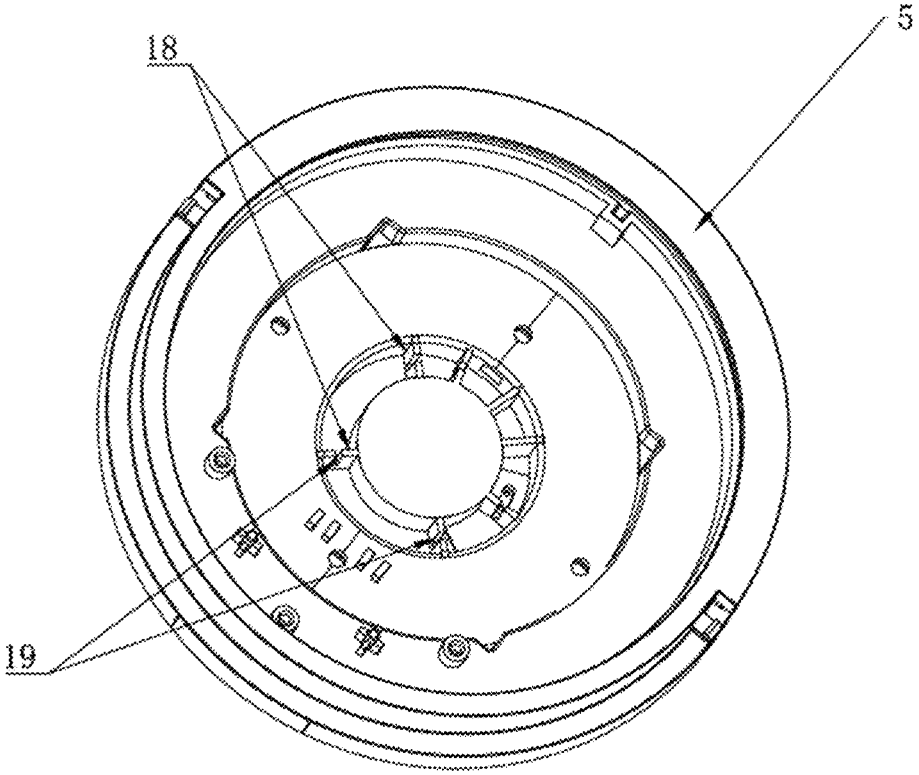
FIG. 4 is a structural schematic diagram of the top of a rotating shaft of a tape camping lamp in an embodiment of the present disclosure.

A tape lamp in the embodiments of the present disclosure is further described referring to FIG. 1 to FIG. 3.

For ease of illustration, spatially relative terms such as “upper”, “lower”, “left” and “right” are used in the embodiments to illustrate the relationship of one element or feature relative to another element or feature shown in the figures. It should be understood that the spatially relative terms are intended to include different orientations in use or operation in addition to the orientation of the device described in the figures. For example, if the device in the figures is inverted, elements recited as being “under” other elements or features are located “on” other elements or features. Therefore, the exemplary term “lower” may include both upper and lower orientations. The device may also be located in other different ways (rotating by 90 degrees or at other orientations), and the spatially relative descriptions used herein are explained accordingly:

Moreover, relational terms such as “first” and “second” are only used to distinguish component with the same name from one another, and do not necessarily require or imply that any actual relationship or sequence exists between these components.

A tape camping lamp includes a base and a lamp housing 1 arranged on the base. The lamp housing 1 is internally provided with an entwined module 2. The entwined module 2 is internally provided with a rolling bearing 3. The rolling bearing 3 is configured to allow the entwined module 2 to rotate on the base. The entwined module 2 is H-shaped. A mounting cavity 4 for accommodating the lamp string is arranged in a gap between the entwined module 2 and the lamp housing 1. The entwined module 2 rotates through the rolling bearing 3 to realize the pull-out and withdrawal of the lamp string inside the lamp housing 1. The base includes a mounting part and a rotating part 6. The mounting part is provided with an annular mounting structure 5 sleeving the periphery of the lamp housing 1 and detachably connected with the lamp housing 1. The rotating part 6 is arranged inside the mounting part and rotatably connected with the mounting part. The rotating part 6 is also provided with a plurality of inserted rods 61. Inserted slots 21 are formed in the entwined module 2 at the positions corresponding to the inserted rods 61. The entwined module 2 is fixed with the rotating part 6 through the inserted rods 61 and the inserted slots 21. The rotating part 6 is also internally provided with a battery jar 62. The battery jar 62 is configured to place dry batteries 63 for power supply. A circuit board 64 is arranged on one side of the battery jar 62. The circuit board 64 is electrically connected with the battery jar 62. The circuit board 64 is also provided with a control switch 65 and a power indicator 66.

A clamping slot 7 is also formed in a side wall of the lamp housing 1. The clamping slot 7 is internally provided with a clamping hook piece 8, a part of the clamping hook piece arranged inside the lamp housing 1 is provided with an embedded slot 81, a part of the clamping hook piece 8 arranged outside the lamp housing 1 is provided with a hook claw 82.

Preferably, an upper end of the entwined module 2 is also provided with a connector 9. One end of the lamp string passes through the connector 9 to be electrically connected with the circuit board 64, and the other end of the lamp string is connected with the embedded slot 81 of the clamping hook piece 8. The circuit board 64 is also provided with a charging port 10. The charging port 10 is also provided with a baffle plate 11.

A groove 13 is also formed in the rotating part 6. The groove 13 is internally provided with a rotating handle 12. The rotating handle 12 is configured to rotate inside the groove 13 to be exposed out of/retracted back to the mounting part.

The lamp housing 1, the base and the entwined module 2 are distributed concentrically and coaxially.

The width-diameter ratio of the rolling bearing 3 inside the entwined module is set to be 0.3-0.5.

A luminous plate 14 is also arranged at the bottom of the entwined module 2. The luminous plate 14 is provided with a plurality of LED lamp beads 15. The luminous plate 14 is electrically connected the circuit board 64. The lamp housing 1 is made of a transparent material.

A U-shaped slot 16 is also formed in the annular mounting structure 5. The U-shaped slot 16 is internally provided with a hook piece 17. The hook piece 17 is configured to rotate around the annular mounting structure 5. The shape of the hook piece 17 is matched with the U-shaped slot 16.

The top of a rotating shaft 20 is also provided with a plurality of fixture blocks 18. The fixture blocks 18 are distributed along the rotating direction of the rotating shaft 20. A fixture slot 19 is formed in each fixture block 18. The lamp string is clamped into the fixture slot 19. An arc-shaped wire structure is formed at the top of the rotating shaft 20. The arc length of the arc-shaped wire structure is ¾ of the circumference of the rotating shaft 20.

A lamp string is arranged on an entwined module 2 inside a lamp housing 1. The entwined module 2 rotates on a base through a rolling bearing 3. The base includes a relatively fixed annular mounting structure 5 and a rotating part 6 which is arranged inside the annular mounting structure and can rotate relative to the annular mounting structure 5. The annular mounting structure 5 is connected with the lamp housing 1. The rotating part 6 rotates inside the annular mounting structure 5, so that the pull-out and withdrawal of the lamp string are realized while the lamp housing 1 and the annular mounting structure 5 keep still. The lamp string with a long length is stored in a mounting cavity 4 inside the lamp housing 1 in a twining manner. The overall storage is convenient, and the occupied space of the lamp string is reduced, so that the lamp string is prevented from being entwined. Dry batteries 63 are used for power supply in the lighting manner of the lamp string. When the power of the lamp string is in shortage, the power is supplemented just by changing the dry batteries 63 inside a battery jar 62. The operation is simple, and the practicability is high. Three dry batteries 63 can be placed inside the battery jar 62, so that the lighting time of the lamp string is prolonged, and the overall cruising ability is improved.

Further, in order to facilitate the lamp string to be pulled out and withdrawn inside the lamp housing 1. The clamping slot 7 is formed in the side wall of the lamp housing 1. The clamping slot 7 is internally provided with a clamping hook piece 8. The clamping hook piece 8 is used for being connected with the lamp string. The lamp string can be pulled out of the clamping slot 7 through the clamping hook piece 8 and is arranged on the outer side of the lamp housing 1. When the lamp string is pulled out of the clamping slot 7, the rotating part 6 rotates in a first direction inside the annular mounting structure 5, and the clamping hook piece 8 is also provided with a hook claw 82, so that a head end of the lamp string can hang at a high place through the hook claw 82, and the lighting range is wider. At the same time, when the lamp string needs to be pulled back into the lamp housing 1 to be stored, the rotating part 6 rotates in a second direction inside the annular mounting structure 5. Moreover, the other end of the lamp string passes through the connector 9) on the entwined module 2 to be electrically connected with the circuit board 64, and the rotating part 6 rotates through the rotating handle 12. During the rotation of the rotating part 6, the entwined module 2 is fixed with the rotating part 6, so that the entwined module 2 synchronously rotates. At the same time, the lamp string is entwined on the entwined module 2 to complete the storage of the lamp string.

At the same time, during the rotation of the entwined module 2, the rolling bearing 3 is kept fixed at the bottom of the entwined module 2, and the installation is convenient, so that the radial run-out of the rolling bearing 3 in the rotational process is effectively avoided. The pull-out and withdrawal of the lamp string are stable, and the width-diameter ratio of the rolling bearing 3 is set to be 0.3-0.5. The small width-diameter ratio can provide higher operational stability, and the rolling bearing 3 does not need to receive excessive bearing capacity in the rotational process. If the width-diameter ratio of the rolling bearing 3 is greater than 0.5, the width of the bearing becomes larger, and the stability in the rotational process is reduced. At the same time, in order to adapt the bearing, a larger lamp housing 1 needs to be provided for assembly, so that the overall volume is increased, and the overall convenience is reduced. Moreover, when the lamp string is pulled out, for the sake of fixed fixture of the lamp string, the fixture slot 19 for clamping the lamp string is formed in the top of the rotating shaft 20. The arc-shaped wire structure is formed after the lamp string is clamped, and the length of the arc-shaped wire structure is ¾ of the circumference, so that the lamp string fixedly abuts against the fixture slot 19 after being pulled. The lamp string abuts against corners of the fixture slot 19 inside the arc-shaped wire structure to form a plurality of fixed points, so that the lamp string is fixed through each fixed point when being pulled, so that the fixation effect is improved.

Moreover, in the process of using the device, the luminous effect of the lamp string is controlled by the circuit board 64 arranged inside the rotating part 6, and the circuit board 64 is provided with a control switch 65. The switching and brightness of the lamp string can be simply adjusted through the control switch 65. At the same time, the hook piece 17 can rotate around the annular mounting structure 5, and provides a handle for grabbing or hanging the camping lamp to facilitate the overall suspension and movement. A luminous plate 14 is arranged at the bottom of the entwined module 2. The luminous plate 14 is provided with a plurality of LED lamp beads 15. The lamp housing 1 is arranged to be transparent. That is, the brightness of the luminous plate 14 can be emitted out through a transparent part of the lamp housing 1, so that the lighting effect is good. At the same time, the circuit board 64 is provided with a power indicator 66. The power indicator 66 is configured to give out green light when the power of the batteries is sufficient and give out yellow light when the power of the batteries is low, so that a user can accurately obtain the current information of a power supply, the problem that the power of the power supply is in shortage is avoided, and the overall using effect is good.

The foregoing descriptions are merely better embodiments of the present disclosure, but are not intended to limit the present disclosure. Common variation and replacement made by those skilled in the art within the scope of the technical scheme of the present disclosure should be included in the protection scope of the present disclosure.

What is claimed is:

1. A tape camping lamp, comprising a base and a lamp housing (1) arranged on the base, wherein the lamp housing (1) is internally provided with an entwined module (2), the entwined module (2) is internally provided with a rolling bearing (3), the rolling bearing (3) is configured to allow the entwined module (2) to rotate on the base, the entwined module (2) is H-shaped, a mounting cavity (4) for accommodating the lamp string is arranged in a gap between the entwined module (2) and the lamp housing (1), the entwined module (2) rotates through the rolling bearing (3) to realize the pull-out and withdrawal of the lamp string inside the lamp housing (1), the base comprises a mounting part and a rotating part (6), the mounting part is provided with an annular mounting structure (5) sleeving the periphery of the lamp housing (1) and detachably connected with the lamp housing (1), the rotating part (6) is arranged inside the mounting part and rotatably connected with the mounting part, the rotating part (6) is also provided with a plurality of inserted rods (61), inserted slots (21) are formed in the entwined module (2) at the positions corresponding to the inserted rods (61), the entwined module (2) is fixed with the rotating part (6) through the inserted rods (61) and the inserted slots (21), the rotating part (6) is also internally provided with a battery jar (62), the battery jar (62) is configured to place dry batteries (63) for power supply, a circuit board (64) is arranged on one side of the battery jar (62), the circuit board (64) is electrically connected with the battery jar (62), and the circuit board (64) is also provided with a control switch (65) and a power indicator (66);

a luminous plate (14) is arranged at the bottom of the entwined module (2), the luminous plate (14) is provided with a plurality of LED (Light Emitting Diode) lamp beads (15), the luminous plate (14) is electrically connected with the circuit board (64), and the lamp housing (1) is made of a transparent material.

2. The tape camping lamp according to claim 1, wherein a clamping slot (7) is formed in a side wall of the lamp housing (1), the clamping slot (7) is internally provided with a clamping hook piece (8), a part of the clamping hook piece (8) arranged inside the lamp housing (1) is provided with an embedded slot (81), a part of the clamping hook piece (8) arranged outside the lamp housing (1) is provided with a hook claw (82).

3. The tape camping lamp according to claim 2, wherein an upper end of the entwined module (2) is provided with a connector (9), one end of the lamp string passes through the connector (9) to be electrically connected with the circuit board (64), the other end of the lamp string is connected with the embedded slot (81) of the clamping hook piece (8), the circuit board (64) is also provided with a charging port (10), and the charging port (10) is also provided with a baffle plate (11).

4. The tape camping lamp according to claim 1, wherein a groove (13) is formed in the rotating part (6), the groove (13) is internally provided with a rotating handle (12), and the rotating handle (12) is configured to rotate inside the groove (13) to be exposed out of or retracted back to the mounting part.

5. The tape camping lamp according to claim 1, wherein the lamp housing (1), the base and the entwined module (2) are distributed concentrically and coaxially.

6. The tape camping lamp according to claim 1, wherein the width-diameter ratio of the rolling bearing (3) inside the entwined module (2) is set to be 0.3-0.5.

7. The tape camping lamp according to claim 1, wherein a U-shaped slot (16) is formed in the annular mounting structure (5), the U-shaped slot (16) is internally provided with a hook piece (17), the hook piece (17) is configured to rotate around the annular mounting structure (5), and the shape of the hook piece (17) is matched with the U-shaped slot (16).

8. The tape camping lamp according to claim 1, wherein the top of a rotating shaft (20) is provided with a plurality of fixture blocks (18), the fixture blocks (18) are distributed along the rotating direction of the rotating shaft (20), a fixture slot (19) is formed in each fixture block (18).

* * * * *